June 28, 1949.     H. R. KIRKLAND     2,474,677
DIMMER DEVICE FOR INDICATING LAMPS
Filed April 18, 1944
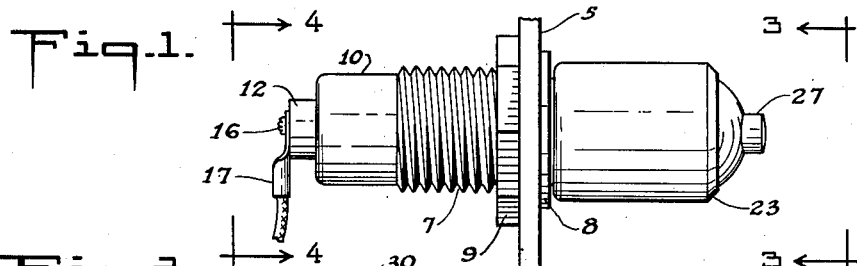
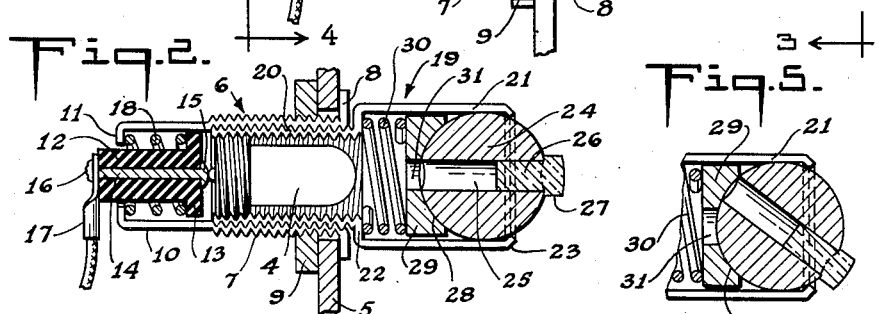
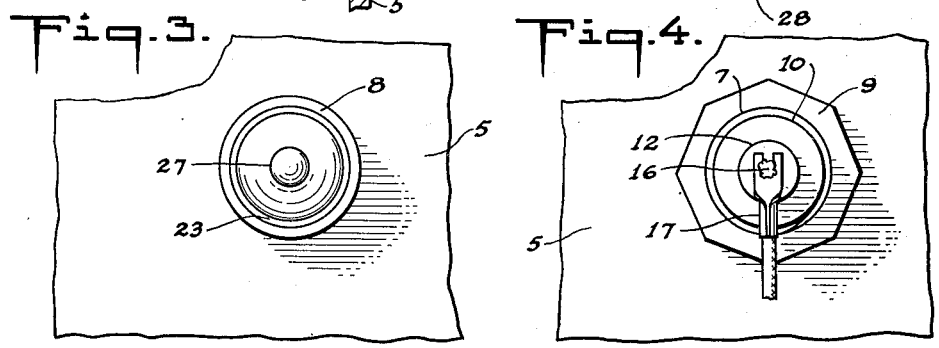
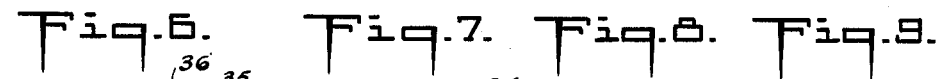
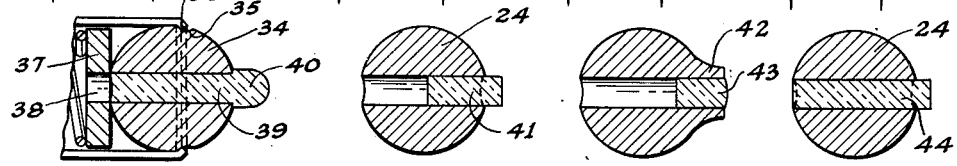
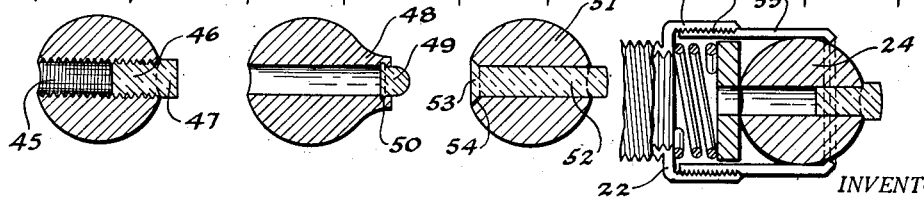
INVENTOR.
HAROLD R. KIRKLAND
BY
ATTORNEYS Patented June 28, 1949

2,474,677

UNITED STATES PATENT OFFICE 2,474,677

DIMMER DEVICE FOR INDICATING LAMPS

Harold R. Kirkland, Morristown, N. J.

Application April 18, 1944, Serial No. 531,567

6 Claims. (Cl. 177—329)

This invention relates to indicating lamps and particularly to means for dimming or blacking out the light from such lamps.

A number of devices for reducing or eliminating the light from a source have been developed in the past, but they have been mostly of the "saltcellar" or superposed disc type; these are subject to a number of drawbacks. In the first place, they are not really effective to insure a gradual opening or closing of the light path. Secondly, they have to be controlled by tension or friction means so that they would not fall open at the wrong time, but such means would often bind so as to make movement of the disc difficult, or quickly wear out so the disc or the like will not stay where it is put.

Another fault of the prior art devices is that they did not provide adequate means for taking hold of them to operate them. Instead, if they had any operating means at all, such means were minute, difficult to grasp, and so remote in nature from anything commonly encountered by the public that the manner of their operation did not readily suggest itself. Thus, being in the dark, and needing light, one would find difficulty in obtaining it, or, on the other hand, would let out a flood of light when only a small beam was desired.

The device of the instant invention overcomes these prior art difficulties by furnishing an actuating member which, by its very nature, readily suggests the manner in which it should be operated. Thus, even in the dark and without prior experience in its use, one could operate the dimmer of the invention effectively without any hesitation. In addition, the construction of the invention enables a smooth and easy adjustment of the light value to be effected from the extremes of fully closed to fully open position and vice versa. Finally, by the improved mounting of the dimming device, any loosening of the controlling or setting means so prevalent in prior art devices, is eliminated.

At the present, the device of the invention is particularly useful since it solves the problem of how to reduce the light value of indicating lamps used in marine, aircraft or tank operations when such equipment must operate in a darkened or blacked out area, but where the operators thereof must still know how the systems they rely on are functioning.

It is accordingly an object of this invention to provide a dimmer or black-out device for light sources, which will maintain any selected variation in light value of the light coming from the source.

Another object of the invention is to provide such a device whose manner of operation is smooth and uniform from one extreme position to the other.

A further object of the invention is to provide a dimmer or blackout device whose manner of operation is extremely simple and self-evident to anyone desiring to operate it.

Further objects of the invention will appear from the following description and claims, and be demonstrated by the accompanying drawing, which shows, by way of illustration, the best manner in which I presently contemplate applying the principle of my invention.

Other embodiments of the invention employing the same principle may be used, and structural changes may be made as desired by those skilled in the art without, however, departing from the spirit of the invention as defined in the appended claims.

Having reference to the drawing,

Figure 1 is a side elevation of a dimmer-member light-source unit in accordance with the invention, which unit is shown as applied to a panel.

Figure 2 is a vertical section taken through the center of Figure 1.

Figure 3 is a front end elevation of the unit shown in Figure 1, looking in the direction of the arrows 3—3 on Figure 1.

Figure 4 is a rear end elevation of the unit shown in Figure 1, looking in the direction of the arrows 4—4 on Figure 1.

Figure 5 is a fragment of the section shown in Figure 2, showing the dimmer member thereof moved to fully cut off position.

Figure 6 is a fragmentary section, showing a modified form of dimmer member and mounting therefor.

Figures 7, 8, 9, 10, 11, and 12 are sections of various modifications of the dimmer member per se, and of modified light transmitting means carried thereby.

Figure 13 is a fragmentary section of the dimmer member and housing therefor, showing an assembly detail.

In the various figures of the drawing, a plate or panel shown at 5, is provided with an opening in which a light-source dimmer-member unit, illustrative of the invention, is secured. Starting from the light source end, the unit is provided with a housing, generally shown at 6, whose forward end is internally and externally screw-threaded at 7, and is flanged over at 8. The flange 8 cooperates with a nut 9, screw-threadedly received on the exterior of portion 7, to secure the unit in place in an opening in the panel, or the like, 5, as shown.

For simplification, the members have been shown as made of metal with no insulation between the panel and the parts of the unit. In this way, the panel provides the ground for the electric circuit in which the light source is included. If, however, it is desired to ground the unit in some other manner, it would be a simple matter to insulate it from the panel by a collar, or the like, of insulating material.

The rear portion 10 of the housing 6 is in the form of a cylinder with the end thereof turned in to form a shoulder, 11. This shoulder terminates at and surrounds an opening through which an insulator 12 extends in free sliding relationship. The insulator is generally cylindrical in form, and is provided on its inner end with a flange 13.

An electrical contact pin 14, extending through the insulator 12, terminates at its inner end in an enlarged contact point 15. The pin 14 is likewise enlarged at its outer end and may be finished off in any manner required for engagement with the terminal member of an electric conduit. In the present instance, it is shown as being soldered at 16 to the terminal lug 17 at the end of the lead-in wire.

To maintain the point 15 always in contact with the center contact point of the light source 4 regardless of whatever shock or jarring the device may be subjected to, I provide some suitable means such as the coiled spring 18. This spring overlies the shank of the insulator 12 and its ends abut respectively against the inner surface of the shoulder 11 and opposing inner surface of the flange 13 on the insulator. It is obvious that various details of the construction just described could be altered without departing from the scope of the invention, but the attempt here is to show the construction in its simplest form for illustrative purposes.

The dimmer-member portion of the unit is likewise enclosed in a housing, which, as shown generally at 19, consists of a small cylinder, or sleeve 20, which is internally and externally screw-threaded, a larger cylinder 21 extending therefrom, and an adjoining collar 22 between them. The size and threading of the cylinder 20 is such that its external screw threads are engageable with the internal screw threads of the cylinder 7, while the internal screw threads of the collar 20 receive the screw-threaded base of the light source 4. The length of the respective members is such that when the cylinder 20 is properly received within the cylinder 7 the contact point of the light source 18 will be in position to be engaged by the contact point 15 of the pin 14. Any variations in this relationship, even though fairly substantial, can be taken up by the action of the spring 18 due to the slidable mounting of the member 12.

The portion 21 of the housing 19 may best be considered as a holder for the dimmer portion of the unit. As such, it is cylindrical in shape, and terminates in an interned lip or the like 23 around its open end. A spherical member 24 of metal or some other opaque material is mounted with the major portion of its body within the holder 21. This sphere is of such a size as to be rockable about its center within the housing 21 but fits the housing closely enough so that no light can escape between them. The sphere is formed with a bore 25 therethrough which is preferably fitted with a piece of light transmitting material of a transparent plastic, glass, or other suitable material. This light transmitting member has a rod like portion 26 secured within the bore by some suitable means, which, in the present instance, would be a force fit or by an appropriate cement. The portion 26 extends outwardly from the surface of the sphere in an enlarged head, or finger grip portion, 27. This enlarged portion not only continues the transmission of the light, but at the same time serves as a handle or knob for actuating the sphere.

The inner face of the sphere 24 has a substantial portion of its surface in engagement with a co-mating surface 28 formed on a seating ring 29. This seating ring is slidably mounted within the holder 21 and, as shown, is urged into constant engagement with the sphere 24 by means of a coiled spring 30. The seating ring 29 is formed with a bore 31 of the same size as the bore 25. The bore 31 extends horizontally and, in the centered position of the sphere 24, registers exactly with the bore 25. Should the sphere 24 be tilted about its center by means of the extension 27, or in any other manner, then the registry of the bore 25 with the bore 31 would be disturbed resulting in the reduction, or complete cut off, of the light transmitted through the transparent rod 26, depending upon the extent of tilt.

In the form shown in Figures 1 to 5, the assembly of the elements within the holder 21 is accomplished by inserting the spring 30, the ring 29, and the sphere 24, in their respective positions in the holder until the sphere is in substantially the position shown in Figure 2. The lip 23 is then formed by turning or curling over the stock at the end of the member 21 to retain the sphere in place and act as an additional bearing surface about which the sphere may tilt. This makes a most satisfactory mounting without involving any unnecessary elements or any unnecessary machining operations, for the spring 30 assures that there will always be sufficient pressure exerted on the sphere through the ring 29 to maintain it in desired position. Obviously, the spring may be replaced by some equivalent resilient element.

The rod 26 may be clear or may be made in various colors, so that, for instance, if several of these indicators are used together, they can be readily distinguished, one from the other. Furthermore, while dimming the light, the sphere may be turned in any desired direction due to the universal nature of the toggle mounting of the sphere.

In Figure 6 there is shown a dimmer element which incorporates several modifications of the elements previously described. In the first place, the sphere as shown at 34 is formed with an annular depression 35 to receive the interned lip 36. This, due to the slight resiliency of the housing 21, provides a snap action, so that when the sphere is moved into centered position, it snaps into place there and is held more rigidly than in the construction previously described. In this form, a modified ring 37 is employed. The ring 37 is provided with a bore 38 the same as is the ring 29 but it presents a flat surface, rather than a concave one, to the face of the sphere. Obviously, this construction is more simple and cheaper than that of Figure 2, but is still a highly effective one. The bore of the sphere is shown as equipped with a modified form of light transmitting rod 39, which extends for the full length of the sphere, and projects outwardly therebeyond to form a finger grip, 40.

In Figure 7, the sphere 24 is the same as that shown in Figures 2 and 3, but it is equipped with a modified form of rod 41, which, though extending outwardly from the sphere, is not provided with any enlargement.

In Figure 8, the sphere itself is formed with an annular protuberance 42 on its outer face within which the light transmitting rod 43 is secured. Thus, the protuberance on the sphere, rather than the extension of the rod, acts as the finger grip.

In Figure 9, a regular sphere is again shown, but in this instance equipped with a straight rod 44 which extends throughout the length of the bore and out beyond the end of the same without any enlargement of the extension.

In Figure 10 the bore through the sphere is shown as screw-threaded at 45, and the portion of the light transmitting rod 46 received therein, is also threaded to mate with it. Here however, the extending portion of the rod 47 is somewhat enlarged. The screw-threading in this form takes the place of the cement, force fit, or the like, employed in the previous forms to retain the rod in place in the bore.

In Figure 11 there is shown a sphere having an extending protuberance 48 similar to that of Figure 8, but in this instance, the transparent member 49 is more in the form of a button than a rod. The button 49 is secured in place by its flange 50 being received in an annular channel communicating with the bore of the sphere. The securing in this instance is effected by flowing the material of the button into the annular channel, or by crimping the metal of the sphere inward to engage the flange when the metal of the sphere is light enough to permit this.

In Figure 12 the sphere 51 is equipped with a light transmitting rod 52 which is flared outwardly and enlarged at its inner end 53 into a chamfered seat 54 formed to receive it.

In Figure 13 there is shown a modified form of holder, or socket, for the sphere 24. According to this construction, the cylindrical portion 55 of the holder is externally screw-threaded at 56 adjacent its inner end to engage with an internally screw-threaded collar 57 which extends from the flange 22. Thus a removable joint is formed which enables the disassembly of the holder should it be desired to replace any of the elements therein.

While a number of modifications of various features of the invention have been shown, it is apparent that others could be made without departing from the scope of the invention. For instance, the light holder and electric contact portion of the unit might incorporate its own source of power; in other words, be constructed like a flashlight casing and equipped with flashlight battery and bulb. On the other hand, the light might come from some common source back of the panel, rather than being provided by an individual source for each unit.

It is accordingly evident that the scope of the invention goes beyond the illustration described above, and shown in the accompanying drawing, and hence it is to be borne in mind that such are to be interpreted merely in an illustrtaive, and not in a limiting sense.

Having described my invention, what I claim as new, and desire to secure by Letters Patent, is:

1. In a dimmer device of the character described, means to interrupt the transmission of a beam of light, means forming part of said interrupting means for transmitting light from said beam, and means, forming part of said transmitting means, for adjusting the position of said interrupting means, to vary the amount of light passed therethrough.

2. In a device of the character described, an opaque light interrupting member formed with a light transmitting channel therethrough, a light transmitting member secured in said channel, and means, forming part of said light transmitting member, for moving said opaque member to vary the direction of light passed therethrough.

3. In a device of the character described, an opaque, substantially spherical member having a bore therethrough for the passage of light, a rod of light transmitting material mounted in said bore, said rod having a protruding portion extending outward for a substantial distance beyond the surface of said spherical member and forming a finger engaging piece for tilting the same.

4. In a device of the character described, a housing, a dimmer movably mounted in said housing in light tight engagement therewith, means to confine a beam of light passing through said housing, and means, forming part of said dimmer for controlling the direction of light transmitted by said confining means.

5. In a structure of the character described, a substantially cylindrical housing, a spherical dimmer member, having a light transmitting aperture therethrough, received in light tight engagement in said housing, and means engaging the inner side of said spherical member for placing the same under tension, said means being formed with a light transmitting aperture therethrough for alignment with the aperture in said spherical member, said spherical member being tiltable about its center whereby the passage of light through said apertures may be varied or interrupted as desired.

6. In structure of the character described, a light obscuring member formed with an elongated light transmitting passage therethrough, and means for mounting said member for universal movement before a light source whereby said obscuring member may be tilted to control the direction of light transmitted through said passage.

HAROLD R. KIRKLAND.

No references cited.